(12) United States Patent
Amend

(10) Patent No.: US 12,526,226 B2
(45) Date of Patent: Jan. 13, 2026

(54) MP-DCCP PROXY TO ENABLE MULTIPATH TRANSMISSION OF DCCP DATA PACKETS BETWEEN A SENDER AND A RECEIVER

(71) Applicant: Deutsche Telekom AG, Bonn (DE)

(72) Inventor: Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/846,669

(22) PCT Filed: Mar. 13, 2023

(86) PCT No.: PCT/EP2023/056340
§ 371 (c)(1),
(2) Date: Sep. 13, 2024

(87) PCT Pub. No.: WO2023/174865
PCT Pub. Date: Sep. 21, 2023

(65) Prior Publication Data
US 2025/0047592 A1    Feb. 6, 2025

(30) Foreign Application Priority Data
Mar. 15, 2022 (EP) .................................. 22162020

(51) Int. Cl.
*H04L 45/24* (2022.01)
*H04L 43/0864* (2022.01)
*H04L 45/00* (2022.01)

(52) U.S. Cl.
CPC .......... *H04L 45/24* (2013.01); *H04L 43/0864* (2013.01); *H04L 45/70* (2013.01)

(58) Field of Classification Search
None
See application file for complete search history.

(56) References Cited

U.S. PATENT DOCUMENTS

2012/0093150 A1    4/2012  Kini
2013/0195004 A1    8/2013  Hampel
(Continued)

FOREIGN PATENT DOCUMENTS

EP    3119057 A1    1/2017

OTHER PUBLICATIONS

Amend Markus et al, "Cost optimized multipath scheduling in 5G for Video-on-Demand traffic", 2021 IEEE Wireless Communications and Networking Conference (WCNC), IEEE, Mar. 29, 2021 (Mar. 29, 2021), p. 1-6, XP033909305.

*Primary Examiner* — Fadi Haj Said
(74) *Attorney, Agent, or Firm* — LEYDIG, VOIT & MAYER, LTD.

(57) ABSTRACT

A packet conversion device includes: a first single path interface arranged for data packet transmission over one communication path or a first multipath interface arranged for data packet transmission over at least two communication paths, wherein the data traffic transmitted over the first single path interface or the first multipath interface is non-Multipath-Datagram Congestion Control Protocol (non-MP-DCCP) data traffic; a second multipath interface arranged for data packet transmission over at least two communication paths, wherein the data traffic transmitted over the second multipath interface is MP-DCCP data traffic; and a packet conversion module arranged to convert non-MP-DCCP data traffic to MP-DCCP data traffic according to a protocol conversion and/or to convert MP-DCCP data traffic to non-MP-DCCP data traffic according to a further protocol conversion for further transmission.

12 Claims, 3 Drawing Sheets

(56) References Cited

U.S. PATENT DOCUMENTS

| | | | |
|---|---|---|---|
| 2014/0359052 A1* | 12/2014 | Joachimpillai | H04L 67/56 709/228 |
| 2021/0014153 A1* | 1/2021 | Amend | H04L 69/14 |
| 2021/0135944 A1* | 5/2021 | S | H04W 28/18 |
| 2021/0234919 A1* | 7/2021 | Paralikar | H04L 67/563 |

* cited by examiner

MP-DCCP PROXY TO ENABLE MULTIPATH TRANSMISSION OF DCCP DATA PACKETS BETWEEN A SENDER AND A RECEIVER

CROSS-REFERENCE TO PRIOR APPLICATIONS

This application is a U.S. National Phase application under 35 U.S.C. § 371 of International Application No. PCT/EP2023/056340, filed on Mar. 13, 2023, and claims benefit to European Patent Application No. EP 22162020.6, filed on Mar. 15, 2022. The International Application was published in English on Sep. 21, 2023 as WO 2023/174865 A1 under PCT Article 21(2).

FIELD

The invention relates to a method, a packet conversion device, a sender, a communication system to enable multipath transmission of Datagram Congestion Control Protocol (DCCP) data packets between a sender and a receiver. The invention also relates to a computer-readable medium containing program instructions for causing a computer to perform the steps of the method for operating the suggested devices.

BACKGROUND

To ensure that Internet protocols can be used as universally as possible and are easy to implement, they are preferably defined in standardization committees [1]. In this context, the so-called Multipath (MP)-DCCP was proposed and defined as a multipath extension of the DCCP [2]. This extension now makes it possible for the single-path protocol DCCP to use multiple paths for transmitting payload between a sender and a receiver in a network. Such a multipath solution makes data transmission more reliable and increases its bandwidth. For this purpose, the various data packets must be distributed to the different communication paths using an appropriate distribution logic unit, in particular a multipath scheduler.

Both DCCP and MP-DCCP have been implemented with a "congestion control" functionality and can adjust the Congestion Window CNWD accordingly to avoid congestion situations of the respective paths.

Two other Internet protocols that will be presented as examples in this context are TCP and UDP, because DCCP with its properties is in a sense located between TCP and UDP and shares some properties with each of these protocols.

User Datagram Protocol (UDP) is a minimal, connectionless network protocol that belongs to the transport layer of the Internet protocol family. UDP allows applications to send datagrams on IP-based computer networks. UDP is a protocol that is only responsible for addressing, without securing the data transmission, as this would lead to delays in a voice transmission, for example. UDP is a connectionless, non-reliable and unsecured as well as unprotected transmission protocol. An application that uses UDP must therefore be insensitive to lost and unsorted packets or must itself provide appropriate corrective measures and, if necessary, also security measures. Since a connection does not have to be established before transmission starts, one connection partner or both partners can start exchanging data more quickly. A three-way handshake as with TCP (the Transmission Control Protocol) for establishing the connection would generate unnecessary overhead in this case.

The Transmission Control Protocol "TCP" is a network protocol that defines how data is to be exchanged between network components. Almost all current operating systems of modern computers are capable of TCP and use it for data exchange with other computers. The protocol is a reliable, connection-oriented, packet-switched transport protocol in computer networks. It is part of the Internet protocol family, the basis of the Internet. In contrast to the connectionless UDP (User Datagram Protocol). TCP establishes a connection between two endpoints of a network connection. Data can be transferred in both directions on this connection. TCP allows data loss to be detected and automatically corrected, data transfer is possible in both directions, network congestion is prevented, and so on. However, all this creates a certain "overhead", which makes TCP more "cumbersome".

The Datagram Congestion Control Protocol (DCCP) is a network protocol of the transport layer. It is used, for example, for the transmission of media streams in IP networks when a congestion control mechanism is to be used. This is because the TCP protocol, which is otherwise frequently used for this purpose, entails disadvantages in the timely delivery of "real-time data"—for example, due to its forced acknowledgement messages. DCCP was developed in such a way that it is easy to switch an application from UDP to DCCP. For this purpose, the required functionality has been kept minimal and additional functions have been moved to higher layers. It can be used with any application that requires unreliable unicast connections with congestion control. So DCCP has less overhead than TCP, but more than UDP, and may be the best compromise for some applications.

DCCP, and therefore its multipath extension MP-DCCP, are therefore especially interesting for services that are latency sensitive or services that can handle less reliable delivery of data packets. In particular, this can apply to video telephony.

However, the following problems arise when implementing corresponding MP-DCCP solutions:
  a) the DCCP services already implemented today usually do not have multipath support, so MP-DCCP cannot be executed. In consequence, these fall back to the single path solution DCCP, whereby in the worst case a communication path is so overstrained that no connection at all is possible. Example: the Linux kernel only supports DCCP so far. A terminal with an implemented MP-DCCP functionality that tries to communicate with such a Linux kernel via MP-DCCP would be confronted with the fact that this is not possible.
  b) As described above, DCCP was designed to provide transport features that are not subject to the strict in-order delivery constraints of TCP. Compared to UDP, however, DCCP has congestion control CC mechanisms to adapt the data rate to the characteristics of the communication paths. Real-time transport over DCCP is an example of how such real-time services can effectively use DCCP. However, since DCCP and especially MP-DCCP are not yet widely used, many central units within a communication network through which traffic passes or is forwarded, such as firewalls or NAT units, are implemented using only the aforementioned UDP and TCP protocols. As a result, DCCP services are rarely implemented and applications must use either the UDP or TCP protocol, even though DCCP would be a better choice for traffic in many cases.

In this context, EP 3 119 057 A1 teaches a proxy server that is configured to perform a conversion of data traffic from one protocol to another protocol if the end devices are not able to support multipath communication of common protocol types so that they can communicate indirectly over one or two proxy servers.

In this context, US 2013/0195004 A1 teaches a method and apparatus for processing TCP packet streams associated with stream-based transport connections to thereby enable communication between a source host and one or more destination hosts.

In this context, US 2012/0093150 A1 teaches an edge router that runs a Multipath Transmission Control Protocol (MPTCP) proxy to allow for a host that implements TCP (Transmission Control Protocol) to operate normally yet reap the benefits of an MPTCP connection. An upgrade of a TCPIP stack on the host is not necessary. The edge router demultiplexes packets received from the host over a TCP connection to an MPTCP connection and multiplexes packets sent to the host over an MPTCP connection to a TCP connection. As a result, higher throughput of packet communication can be realized, for example, for improved video support.

SUMMARY

In an exemplary embodiment, the present invention provides a packet conversion device, in particular a Multipath-Datagram Congestion Control Protocol (MP-DCCP) Proxy, for enabling transport of MP-DCCP data traffic in a communication network between a sender and a receiver. The packet conversion device includes: a first single path interface arranged for data packet transmission over one communication path or a first multipath interface arranged for data packet transmission over at least two communication paths, wherein the data traffic transmitted over the first single path interface or the first multipath interface is non-MP-DCCP data traffic; a second multipath interface arranged for data packet transmission over at least two communication paths, wherein the data traffic transmitted over the second multipath interface is MP-DCCP data traffic; and a packet conversion module arranged to convert non-MP-DCCP data traffic to MP-DCCP data traffic according to a protocol conversion and/or to convert MP-DCCP data traffic to non-MP-DCCP data traffic according to a further protocol conversion for further transmission. The packet conversion device is configured to perform a coordinated connection establishment between the sender and the receiver, and the packet conversion device is configured to perform a three way handshake with each of the sender and the receiver.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
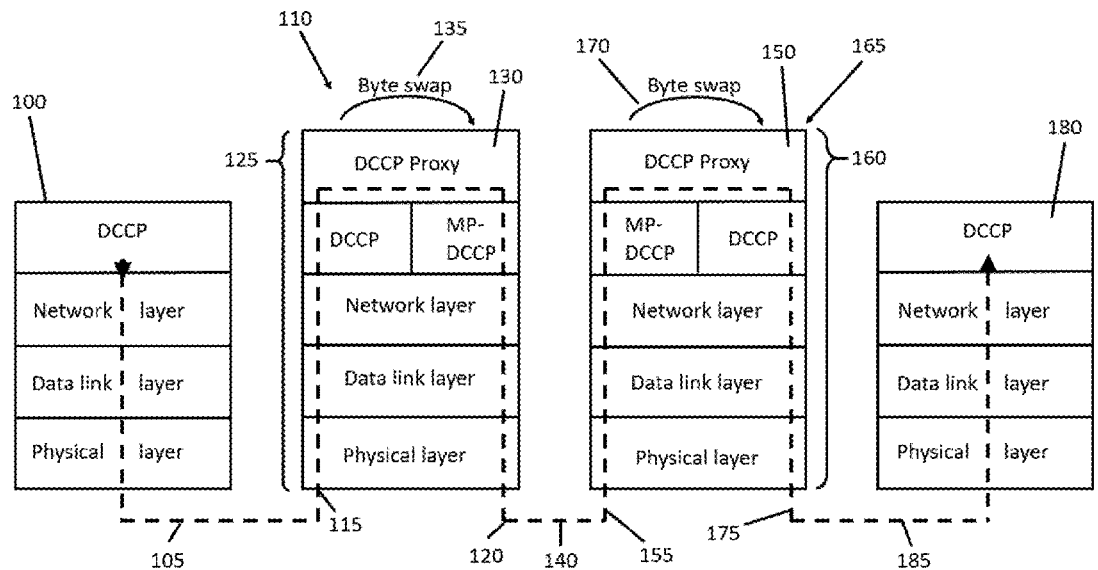
FIG. 1a shows an MP-DCCP proxy setup according to an embodiment of the invention.

Exemplary embodiments of the present invention provide a method, a packet conversion device and a communication system, which overcome the aforementioned problems and enable multipath transmission of DCCP data packets. Exemplary embodiments of the present invention further provide a computer-readable medium containing program instructions for causing a computer to perform the provided method for operating the suggested devices.

The features of the various aspects of the invention described below or the various examples of implementation may be combined with each other, unless this is explicitly excluded or is technically impossible.

If the specification describes more than one communication path, it is to be understood that these communication paths are at least logically separated. In particular, the communication paths are based on different technologies like cellular, Wi-Fi, DSL, etc.

According to a first aspect, a packet conversion device, in particular a MP-DCCP Proxy, is provided for enabling transport of multipath DCCP data traffic in a communication network between a sender and a receiver, comprising:

a first single path interface being arranged for data packet transmission over one communication path or a first multipath interface being arranged for data packet transmission over at least two communication paths; wherein the data traffic transmitted over the first single path interface or the first multipath interface is non-MP-DCCP data traffic:

to explain the term MP-DCCP data traffic: in the case of the one communication path the non-MP-DCCP data traffic can be a single path DCCP traffic or any data traffic that is not of DCCP nature. Hence, in the case of the more than communication path, only one communication path can be single path DCCP. But as explained before, this one communication path can also be any data traffic that is not of DCCP nature. The other communication paths are not of DCCP nature.

a sender—or more technically: a sender entity—can be user equipment like a smart phone, a computer or a server that is associated to a company. It is possible that the sender is configured to support MP-DCCP data traffic or that the sender cannot support MP-DCCP. In case that the sender cannot support MP-DCCP it follows that this sender supports non-MP-DCCP data traffic. To give some examples for the non-MP-DCCP data traffic case, it is possible that the sender transmits UDP or TCP data traffic and that the first single path interface hence supports UDP and/or that TCP data traffic. It is also possible that the sender transmits UDP (MP-UDP) or multipath TCP "MP-TCP data traffic and the first multipath path interface hence supports multipath UDP (MP-UDP) or multipath TCP "MP-TCP" data traffic. In either case, if a MP-DCCP data traffic is to be established between the sender and the receiver, it follows that the traffic from the sender needs appropriate conversion.

A receiver—or more technically: a receiver entity—can be user equipment like a smart phone, a computer or a server that is associated to a company. It is possible that the receiver is configured to support MP-DCCP data traffic or that the receiver cannot support MP-DCCP. In case that the receiver cannot support MP-DCCP it follows that this receiver supports non-MP-DCCP data traffic. To give some examples for the non-MP-DCCP data traffic case, it is possible that the receiver receives UDP and/or that TCP data traffic and that the first single path interface hence supports UDP and/or that TCP data traffic. It is also possible that the receiver receives UDP (MP-UDP) or multipath TCP "MP-TCP" and that the first multipath path interface hence supports multipath UDP (MP-UDP) or multipath TCP "MP-TCP". In either case, if a MP-DCCP data traffic is to be established between the sender and the receiver, the traffic in direction to the receiver needs appropriate conversion.

Preferably, it follows that the first single path interface or the first multipath interface is configured to be oriented towards the entity that does not support MP-DCCP traffic. If both entities do not support MP-DCCP traffic than two appropriately arranged packet conversion devices are needed to enable MP-DCCP data traffic between the sender and the receiver.

It is clear in a typical packet data transfer that the sender and the receiver can change the roles so that the sender becomes the receiver and vice versa depending on the direction of the data traffic.

a second multipath interface being arranged for data packet transmission over at least two communication paths; wherein the data traffic transmitted over the second multipath interface is MP-DCCP data traffic:

Preferably, it follows that the second multipath interface is configured to be oriented towards the entity that does support MP-DCCP traffic.

a packet conversion module being arranged to convert non-MP-DCCP data traffic to MP-DCCP data traffic and/or to convert MP-DCCP data traffic to non-MP-DCCP data traffic for further transmission.

In particular a packet conversion module being arranged to convert non-MP-DCCP data traffic to MP-DCCP according to a protocol conversion data traffic and/or to convert MP-DCCP data traffic to non-MP-DCCP data traffic according to a further protocol conversion for further transmission;

The conversion of non MP-DCCP data traffic to MP-DCCP data traffic is necessary if the sender does not support MP-DCCP in order to enable multipath transmission of MP-DCCP data traffic over the network to the receiver. The packet conversion module can comprise a database with information how to convert other protocols to MP-DCCP data traffic; in particular, how to convert UDP, MP-UDP, TCP, MP-TCP, and/or data traffic to MP-DCCP data traffic;

The conversion of MP-DCCP data traffic to non-MP-DCCP data traffic is necessary if the receiver does not support MP-DCCP in order to enable that the receiver can process the data. In particular, the packet conversion module has access to the information which protocols are supported by the receiver so that it can convert the MP-DCCP data traffic to data traffic the receiver is able to process. It is possible that the receiver sends the information about the data traffic protocols it supports at the beginning of a connection establishment. The packet conversion module can comprise a database with information how to convert MP-DCCP data traffic to other protocols; in particular, how to convert MP-DCCP data traffic to UDP, MP-UDP, TCP, MP-TCP:

the packet conversion module can be implemented as an algorithm on a processor of the packet conversion device.

The packet conversion device provides the advantage of enabling MP-DCCP data traffic between a sender and a receiver if at least one of them does not support MP-DCCP data traffic. Advantageously, it solves the problems described in the introduction under a) and b). It follows that applications that need latency sensitive data traffic can employ MP-DCCP efficiently even if other devices or parts of the communication network do not support MP-DCCP. Hence, the MP-DCCP proxy can terminate DCCP or MP-DCCP connections and convert them into the other network protocol or vice versa. If the description mentions a conversion of data traffic, it is to be understood, that this is being performed on the level of individual data packets, because the data traffic in the context of the invention is made up of individual data packets.

In an embodiment, the packet conversion device is a proxy that can be named a MP-DCCP proxy. This provides the advantage that the proxies are typically equipped with a hardware configuration to facilitate these tasks. Since proxies are already implemented frequently within the communication network, it is possible to carry out the invention by writing an appropriate packet conversion algorithm to realize the packet conversion module as software.

In an embodiment, a packet conversion is accomplished by the packet conversion module as incoming data packets are transformed from the incoming data packet protocol towards the outgoing data packet protocol for further transmission. The packet conversion device receives data packets, which are separated according to an aspect of the present invention into payload and overhead such as routing information. One possibility is to keep the protocol into which an incoming data packet is to be converted as an unfilled template. The template comprises a header portion and a payload portion. Hence, the payload of the incoming data packet can be shifted in the payload portion of the outgoing data packet and the header portion can be filled at least with appropriate routing information. Hence, payload data can be separated from routing information of the incoming interface and coupled with routing information of the outgoing interface.

Preferably, the packet conversion module is configured to convert at least one data packet received over the first single path interface to at least one data packet to be transmitted over the second multipath interface by rewriting and/or introducing header information of the at least one data packet received over the first single path interface. It is understood by the skilled person that the conversion of at least one data packet is bidirectional. In other words, preferably the conversion module is configured to convert at least one data packet received over the multipath interface to at least one data packet to be transmitted over the single path interface by rewriting and/or introducing header information of the at least one data packet received over the multipath interface.

Preferably, the packet conversion module is configured to convert the at least one data packet received over the first single path interface to at least one data packet to be transmitted over the multipath interface by not changing the payload. As mentioned before, it is clear for the skilled person that the conversion of the at least one data packet is bidirectional. Therefore, preferably the packet conversion module is configured to convert the at least one data received over the multipath interface to at least one data packets to be transmitted over the single path interface by not changing the payload.

In an embodiment, the packet conversion device comprises a multipath scheduler, wherein the multipath scheduler distributes the MP-DCCP data traffic received over the second multipath interface between the at least two communication paths of the first multipath interface and/or the multipath scheduler distributes the non-MP-DCCP data traffic received over the first multipath interface between the at least two communication paths of the second multipath interface.

This provides the advantage that multiple paths can be used as it is necessary to distribute the data traffic amongst the multiple paths. For its decision how much data packets shall be distributed to a distinct path out of the multiple paths, the multipath scheduler can take the characteristics of that path into account. Characteristics of the path can be available bandwidth, latency, loss of packets etc. In general, the multipath scheduler is programmed to distribute more data packets to the path that provides a higher quality of service to the customer or to the path that has the lowest costs.

In an embodiment, the packet conversion is configured to perform a coordinated or an uncoordinated connection establishment between the sender and the receiver.

Typically, a DCCP connection, as well as an MP-DCCP connection, comprises of a three-way handshake to guarantee a chain of connected flows. If the packet conversion device is placed between the sender and the receiver, wherein at least one of the sender or the receiver is a non-MP-DCCP device, then the packet conversion device performs this three way handshake with each of the sender and the receiver.

We speak of an uncoordinated connection establishment if the packet conversion device performs a three-way handshake with the sender and the receiver individually without taking answers of the other device into account. For example, it can happen that the packet conversion device performs a successful three-way handshake with the sender, while it is unsuccessful performing the three-way handshake with the receiver. Of course, if the sender starts to transmit data packets, these data packets will not be received by the receiver and the data connection fails. However, if the three-way handshake with the receiver is also successful, the uncoordinated connection establishment provides the advantage of a reduced latency and a faster connection establishment, because the packet conversion device does not wait for the other device to answer.

We speak of a coordinated connection establishment if the packet conversion device receives a request from the sender, then it sends an appropriate request to the receiver and wait for the response of the receiver to answer the sender. It is an advantage of this alternative that data packets sent by the sender can be provided with a successful connection establishment.

In an embodiment, the packet conversion device is configured to pass through options and/or feature elements of the data traffic, in particular DCCP options and/or feature elements, for further transmission between the sender and the receiver.

In an embodiment, it is also possible to pass through TCP and/or UDP options and/or feature elements.

Those DCCP options and/or feature elements are part of the original data traffic generated by the sender. Since the packet conversion device terminates the data traffic of the sender, the DCCP options and/or feature elements of the original data traffic get lost in the state of the art. A state of the art proxy only swaps payload. This embodiment of the invention now proposes to pass through this information to the receiver.

In a possible implementation version, a packet conversion module is configured to extract those DCCP options and/or feature elements from the header information of the original data packets and to write the extracted elements into the header information of the data packets it creates for further transmission. Since DCCP options and/or feature elements is information about the entity and its characteristics, this provides information for the sender and the receiver how to set up their communication.

In an embodiment, the packet conversion device is configured to pass through a selection DCCP options and/or feature elements.

In an embodiment, the packet conversion device is configured to create data packets for further transmission that only contain those DCCP options and/or feature elements without payload and to pass through this information to the receiver before the actual payload transmission starts. This has the advantage that the sender at the receiver can agree on certain transmission characteristics before the actual transmission starts. This will increase the efficiency of the communication between the sender and the receiver.

In an embodiment, the passed through DCCP options and/or feature elements, in particular DCCP options and/or feature elements, comprise:
  timestamp information,
    the timestamp information can further comprise the timestamp, the timestamp and/or elapsed time. One piece or a combination of this information can be used to explicitly measure the round trip time between the sender and the receiver, instead of measuring the round trip time only between one of the endpoints and the proxy.
  It is also possible to make a latency assessment using one or a combination of these information.
  If the round trip time or the latency is too high for a certain application when using a first packet conversion device between the sender and the receiver, the application running on the sender or the receiver can be configured to trigger a change of the packet conversion device. In other words, the sender and/or the receiver or the application running on the sender and/or the receiver is configured to address a further packet conversion device if the latency or the round trip time of the actual used packet conversion device is too high. The sender and/or the receiver can be configured to have a database that lists the addresses of multiple packet conversion device. The sender and or the receiver can be configured to select a packet conversion device from the database by taking their present location into account, wherein the packet conversion device closest to the sender or the receiver is being chosen.
  It is even possible to set to different timestamp options, wherein the first option is the timestamp information between the sender and the receiver and the second option is the timestamp information between the proxy and the sender. By calculating the ratio of the resulting round trip times R=T(round trip time between the sender and the receiver)/T (round trip time between sender or receiver and the packet conversion device) it is possible to estimate the effect on the round trip time that is introduced by addressing the packet conversion device. The lower the value of R is, the better the chance to reduce the overall latency by using another packet conversion device.

change L/R, confirm L/R, by exchanging these the DCCP options, the sender and the receiver can agree on a common basis of DCCP options and/or feature elements that they can share and that they can both use to set up an efficient connection establishment. In particular, this agreement on a common set of DCCP options and/or feature elements can be performed between the sender and the receiver when performing the three-way handshake connection establishment so that they can advantageously adjust their respective communication characteristics before the pay load data is being transmitted.

As an example, the sender and the receiver can agree on a specific congestion control mechanism.

If the sender or the receiver are not capable of supporting one of the DCCP options and/or feature elements the respective other device needs, they can agree to fall back to single path mode.

data dropped, if the amount of data packets dropped is too high, the sender and or the receiver can be configured to fall back to single path mode or to trigger the change to another packet conversion device. It is also possible that the sender and the receiver agree on using another congestion control mechanism or to simply decrease the bandwidth if the amount of data packets lost is too high.

congestion control, CCID-specific features, and/or as already stated before, it is beneficial if the sender and the receiver agree on the same congestion control mechanism, which makes the data transmission much more efficient since not all congestion control mechanisms are compatible with one another. End-to-end negotiation of applied CCID, instead of decoupled negotiation between endpoints and proxy, ensures a consistent experience if applications running on the sender or the receiver have a dependency on individual congestion control mechanisms.

multi path capability.

A negotiation of the multipath support end-to-end helps the sender or the receiver to understand what the respective other device is supporting. For example, if they get the information that the sender and the receiver both are MP-DCCP capable they can instantly agree to bypass the packet conversion device or the next time when they perform a connection establishment.

Swapping the DCCP options and features from one to the other flow will preferably be implemented on a selective basis.

In the following, tables 1 and 2 copied unmodified from [2], give an overview which options and features are defined so far in DCCP.

TABLE 1

DCCP Options

| Type | Option length | Meaning | DCCP-Data | Section reference |
|---|---|---|---|---|
| 0 | 1 | Padding | Y | 5.8.1 |
| 1 | 1 | Mandatory | N | 5.8.2 |
| 2 | 1 | Slow receiver | Y | 11.6 |
| 3-31 | 1 | Reserved | | |
| 32 | variable | Change L | N | 6.1 |
| 33 | variable | Confirm L | N | 6.2 |
| 34 | variable | Change R | N | 6.1 |
| 35 | variable | Confirm R | N | 6.2 |
| 36 | variable | Init cookie | N | 8.1.4 |
| 37 | 3-8 | NDP count | Y | 7.7 |
| 38 | variable | Ack Vector [Nonce 0] | N | 11.4 |
| 39 | variable | Ack Vector [Nonce 1] | N | 11.4 |
| 40 | variable | Data dropped | N | 11.7 |
| 41 | 6 | Timestamp | Y | 13.1 |
| 42 | 6/8/10 | Timestamp echo | Y | 13.3 |
| 43 | 4/6 | Elapsed time | N | 13.2 |
| 44 | 6 | Data checksum | Y | 9.3 |
| 45-127 | Variable | Reserved | | |
| 128-255 | variable | CCID-specific options | — | 10.3 |

TABLE 2

DCCP Feature Numbers

| Number | Meaning | Rec'n Rule | Initial value | Req'd | Section reference |
|---|---|---|---|---|---|
| 0 | Reserved | | | | |
| 1 | Congestion control ID (CCID) | SP | 2 | Y | 10 |
| 2 | Allow short Seqnos | SP | 0 | Y | 7.6.1 |
| 3 | Sequence window | NN | 100 | Y | 7.5.2 |
| 4 | ECN incapable | SP | 0 | N | 12.1 |
| 5 | Ack ratio | NN | 2 | N | 11.3 |
| 6 | Send Ack vector | SP | 0 | N | 11.5 |
| 7 | Send NDP count | SP | 0 | N | 7.7.2 |
| 8 | Minimum Checksum coverage | SP | 0 | N | 9.2.1 |
| 9 | Check data Checksum | SP | 0 | N | 9.3.1 |
| 10-127 | reserved | | | | |
| 128-255 | CCID-specific features | | | | 10.3 |

In an embodiment, the packet conversion device is configured to pass through the DCCP options and/or feature elements in a separate message before payload transmission starts.

This provides the advantage that the sender and the receiver can be configured to agree on the best transport characteristics taking their respective capabilities into account before sending the actual payload data. This makes the communication more efficient.

In an embodiment, the packet conversion module is configured to convert UDP and/or TCP data traffic to MP-DCCP data traffic and/or to convert MP-DCCP data traffic to UDP and/or TCP data traffic data traffic for further transmission.

This provides the advantage that the sender and/or the receiver that only supports UDP or TCP traffic can profit from a MP-DCCP transport.

In an embodiment, it is also possible to pass through TCP and/or UDP options and/or feature elements.

This provides the advantage that the communication of the sender and/or the receiver that only supports UDP or TCP traffic can be efficiently optimized as described above within the context of the passed-through DCCP options and/or feature elements.

In the following exemplary TCP options and/or feature elements are listed: End of Option List; No-Operation, Maximum Segment Size, Window Scale, SACK Permitted, SACK, Echo (obsoleted by option 8), Echo Reply (obsoleted by option 8), Timestamps, Partial Order Connection Permitted (obsolete), Partial Order Service Profile (obsolete), CC (obsolete), CC, NEW (obsolete), CC, ECHO (obsolete), TCP Alternate Checksum Request (obsolete), TCP Alternate Checksum Data (obsolete), Skeeter, Bubba, Trailer Checksum Option, MD5 Signature Option (obsoleted by option 29), SCPS Capabilities, Selective Negative Acknowledgements, Record Boundaries, Corruption experienced, SNAP, TCP Compression Filter, Quick-Start Response, User Timeout Option (also, other known unauthorized use), TCP Authentication Option (TCP-AO), or Multipath TCP (MPTCP), Especially, the timestamp can be of interest.

In the following exemplary UDP options and/or feature elements are listed: No operation (NOP), Option checksum (OCS), Alternate checksum (ACS). Fragmentation (FRAG), Maximum segment size (MSS), Maximum reassembled segment size (MRSS), (varies) Unsafe to ignore (UNSAFE) options, Timestamps (TIME), (varies) Authentication (AUTH), Request (REQ), Response (RES), (varies) UNASSIGNED (assignable by IANA), RESERVED, or (varies) RFC 3692-style experiments (EXP). Especially, the timestamp can be of interest.

In an embodiment, the packet conversion module is configured to convert the UDP and/or TCP data traffic in a first step to a DCCP data traffic und to convert the DCCP data traffic in a second step to MP-DCCP and vice versa.

This provides the advantage that a DCCP to MP-DCCP conversion algorithm can be used as its input data is the same. This provides a modular approach for programming the individual conversions, which is in general more efficient.

According to a second aspect, a sender is provided that is configured to communicate with a receiver by utilizing a packet conversion device as described above, wherein the sender is configured to select a packet conversion device by taking its local position into account.

In particular, the sender will select the packet conversion device that is closest to his local position. This minimizes the single path transmission length so that MP-DCCP data traffic can efficiently be employed. The sender can comprise a database with local positions of various packet conversion devices or the sender can request a list of packet conversion devices around its own local position from a network provider.

In an embodiment, the sender is configured to address a further packet conversion device if the latency or the round trip time of the actual used packet conversion device exceeds a predefined threshold.

The predefined threshold can be set by an application that uses the data traffic running on the sender and/or the predefined threshold can be set within the operating system of the sender. This provides the advantage that a criterion is provided that enables the decision to address the further packet conversion device.

According to a third aspect of the invention, a communication system, in particular a telecommunication system, is provided comprising
 a sender,
 a receiver,
 a network to facilitate a data traffic between the sender and the receiver, and
  the network can comprise multiple communication paths, especially malleable communication paths that are technically different from each other, like cellular, Wi-Fi, DSL or the like:
 a packet conversion device as described above, wherein the packet conversion device is arranged to receive data traffic from the sender, then is configured to convert the received data traffic and to forward the converted data traffic to the receiver.

This basically provides the same advantages as described within the context of the packet conversion device.

In an embodiment, the packet conversion device is being arranged within the communication path between the sender and the receiver or that the packet conversion device is being arranged outside the communication path between the sender and the receiver.

Being arranged within the communication path means that the packet conversion device is located within the communication path that connects the sender and the receiver directly. Being arranged outside the communication path means that this is not the communication path the sender and the receiver would normally choose to communicate with each other as a first choice. In that sense the data connection undergoes a kind of detour.

If the packet conversion devices being arranged within the communication path between the sender and the receiver this provides the advantage that
 the multipath services can be used very efficiently because detour is avoided; this is in particular the case if the packet conversion devices are in close proximity to the sender and/or the receiver. For example, this could be the case if the packet conversion device is being implemented in a residual gateway in the home network environment of the user.
 A further advantage of this option is that there is no need to explicitly address the packet conversion device because it is within the communication path anyhow. Neither sender nor receiver need to know an IP address of the proxy.

If the packet conversion devices is being arranged outside the communication path between the sender and the receiver this provides the advantage that.
 existing systems can be easily provided with MP-DCCP functionality by implementing packet conversion devices at preferred locations within the communication network. For example, the proxy could be employed within a cloud of the network provider so that basically every sender and/or receiver has access to this proxy via the communication network. It follows that the sender and/or the receiver need to know the address of those packet conversion devices within the communication network. It is possible to store these addresses within the database of the sender and/or the receiver or that the operating system of the sender and/or the receiver or an application running on the sender and/or the receiver requests the addresses of packet conversion devices within the network. Of course, it is possible to update such a database. Hence, this option provides very flexible and easy to implement solution.

In an embodiment, the packet conversion device is implemented on a residential gateway.

This provides the advantage that the packet conversion device is very close to the sender, wherein the sender can be user equipment like a smart phone, a tablet, a computer, etc. This also provides the advantage that multiple user equipment can make use of the upgraded residential gateway.

According to a fourth aspect of the invention, a method for operating a packet conversion device, in particular a MP-DCCP Proxy, is provided for enabling transport of multipath DCCP data traffic in a communication network between a sender and a receiver, comprising:

operating a first single path interface that is arranged for data packet transmission over one communication path or a first multipath interface being arranged for data packet transmission over at least two communication paths; wherein the data traffic transmitted over the first single path interface or the first multipath interface is non-MP-DCCP data traffic;

operating a second multipath interface that is arranged for data packet transmission over at least two communication paths; wherein the data traffic transmitted over the second multipath interface is MP-DCCP data traffic;

operating a packet conversion module that is arranged to convert non-MP-DCCP data traffic to MP-DCCP data traffic and/or to convert MP-DCCP data traffic to non-MP-DCCP data traffic for further transmission.

In particular, operating a packet conversion module that is arranged to convert non-MP-DCCP data traffic according to a protocol conversion to MP-DCCP data traffic and/or to convert MP-DCCP data traffic to non-MP-DCCP data traffic according to a further protocol conversion for further transmission.

The method basically provides the same advantages as described above.

According to a fifth aspect of the invention, a computer program product is provided containing program instructions for causing a processor, in particular a processor of a MP-DCCP proxy, to perform the method described above.

The computer program product basically provides the same advantages as described above.

In the following, preferred implementation examples of the present invention are explained with reference to the accompanying figure:

In the following, numerous features of the present invention are explained in detail via preferred embodiments. The present disclosure is not limited to the specifically named combinations of features. Rather, the features mentioned here can be combined arbitrarily in various embodiments, unless this is expressly excluded below.

FIG. 1 shows an MP-DCCP proxy setup according to an embodiment of the invention. A sender is DCCP capable and connected over a single path 105 to a first proxy 110. The first proxy has a first single path interface 115 and a second multipath interface 120. The DCCP data traffic transmitted by the sender 100 to the first proxy 110 passes through the different OSI layers 125 until it reaches the packet conversion module 130 of the first proxy 110. The packet conversion module 130 converts the DCCP data traffic to MP-DCCP data traffic and creates appropriate data packets. In particular, a bite swap 135 of the payload is being performed. The created MP-DCCP data packets passed through the different OSI layers 125 in the opposite direction and leave the first proxy 110 via the second multipath interface 120 and are transmitted over a multipath to a second proxy 150.

The second proxy 150 comprises a further second multipath interface 155 to receive the MP-DCCP data packets. Those data packets pass through the different OSI layers 160 of the second proxy 150 until they reach the packet conversion module 165 of the second proxy 150. The packet conversion module 165 of the second proxy is configured to convert MP-DCCP data traffic to DCCP data traffic for further transmission. In particular, a bite swap 170 of the payload is being performed. The DCCP data packets leave the second proxy 150 via a further first single path interface 175 and are communicated to a receiver 180 by using a further single path connection 185.

It can be seen that even if the sender 100 and the receiver 180 are not MP-DCCP capable, the proxy 110 and the proxy 150 provide a solution that at least in some sections the MP-DCCP use is possible.

If the sender 100 is MP-DCCP capable then only the second proxy 150 is necessary to provide a solution that at least in some sections the MP-DCCP use is possible. On the other hand, if the receiver 180 is MP-DCCP capable then only the first proxy 110 is necessary to provide MP-DCCP traffic in at least some sections.

The MP-DCCP proxy terminates DCCP or MP-DCCP connections and convert them into the respective other network protocol. For that the payload of the DCCP or MP-DCCP packet is extracted from the incoming data flow and put into a new established DCCP or MP-DCCP flow.

Figure 1B:
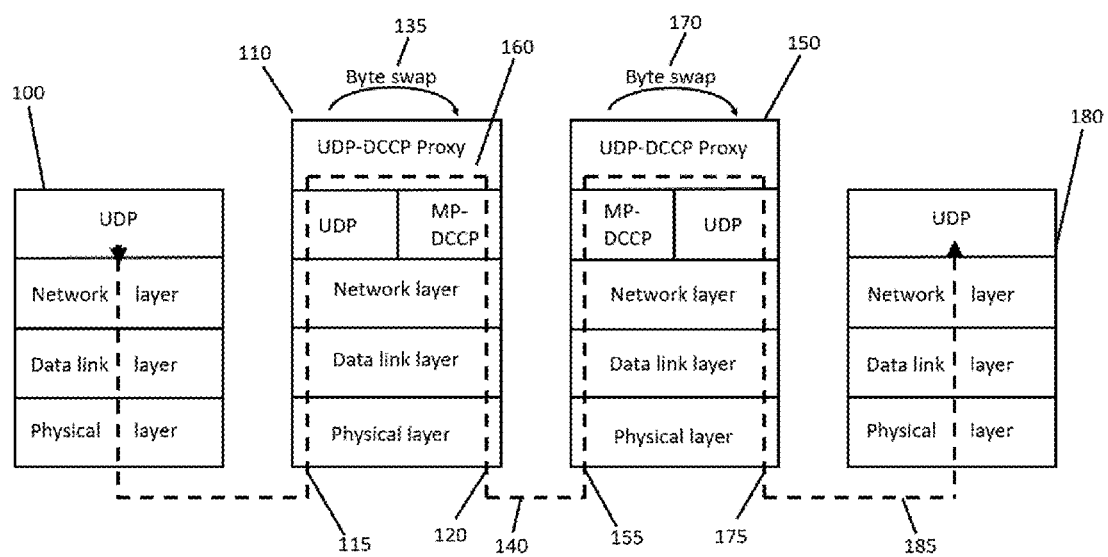
FIG. 1b shows the setup of FIG. 1a, wherein the MP-DCCP proxy supports further initial protocol conversion.

FIG. 1b shows the setup of FIG. 1a, wherein the MP-DCCP proxy supports a further initial protocol conversion.

In case the terminals, that is the sender 100 and the receiver 180, are not DCCP capable, but instead use UDP and/or TCP protocol for the data traffic, the MP-DCCP proxies 110, 150 can even help to provide multipath transport for such scenarios. The concept in FIG. 1b therefore proposes to swap 135 the payload between the UDP and the DCCP flows in a similar way as it is proposed for DCCP terminals in FIG. 1a. This can be implemented as follows, the UDP data traffic arrives at the MP-DCCP proxies 110—that can also be named as UDP Proxy as it now converts UDP data traffic. The packet conversion module 160 is configured to extract the payload of the UDP datagram and provide it to an existing or newly created MP-DCCP connection. It is possible that the UDP payload is directly swapped to a newly created MP-DCCP data packet or that the UDP payload is in a first step converted to a DCCP data packet, wherein a MP-DCCP connection is created from this the DCCP data packet. Technically, this is done in the same way when at least one of the sender 100 and/or receiver 180 use TCP data traffic. It is even possible that the sender 100 uses TCP data traffic, while the receiver 180 this UDP data traffic or vice versa. In this case one would need a UDP-DCCP proxy and a TCP-DCCP proxy, wherein the respective proxies are arranged accordingly. This means, if the sender uses TCP data traffic it sends the data packets to a TCP-DCCP proxy, wherein the TCP-DCCP proxy sends the MP-DCCP data traffic to the UDP-DCCP proxy, and wherein the UDP-DCCP proxy sends the UDP data traffic to the receiver 180.

If one of the sender 100 or the receiver 180 are MP-DCCP capable, while the other only supports TCP and/or UDP data traffic, then only one TCP-DCCP proxy and/or UDP-DCCP proxy is needed, respectively.

FIG. 1b provides the advantage that UDP capable terminals 100, 180 can profit from a MP-DCCP transport. While an implicit method to get traffic passing the MP-DCCP proxy does not need further enhancements, an explicit method does. The implicit and the explicit method will be described below in the context of FIG. 3. In the case of the explicit method, destination address information has to be transmitted out-of-band or in-band, e.g. using UDP options [4] or the TCP header, especially using the options field, or in the payload, especially as part of the TCP handshake process. The address information of the MP-DCCP proxy can also be stored within the operating system or application of the sender.

That has the benefit, that even UDP or TCP flows can be transmitted through a MP-DCCP proxy, which is not residing in the direct communication path. To map the traffic between UDP and MP-DCCP it requires a mapping table, preferably located in the Proxy itself. This mapping table is updated according to the provided address information within the "implicit" or "explicit" setup.

Figure 2A:
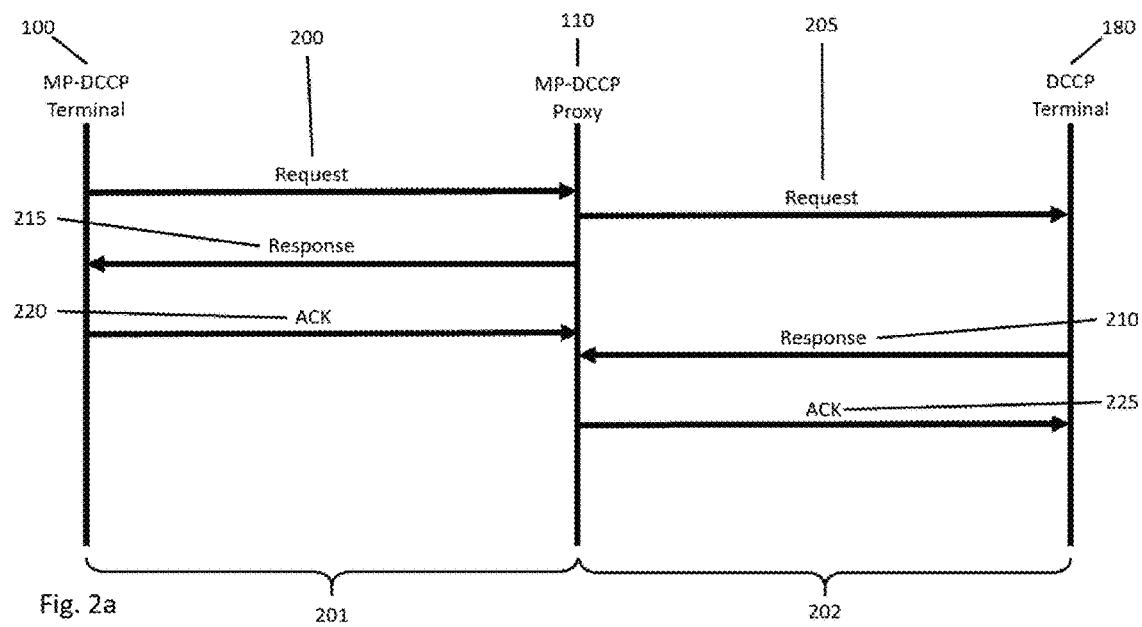
FIG. 2a shows an uncoordinated connection establishment between a sender and a receiver via the MP-DCCP proxy.
Figure 2B:
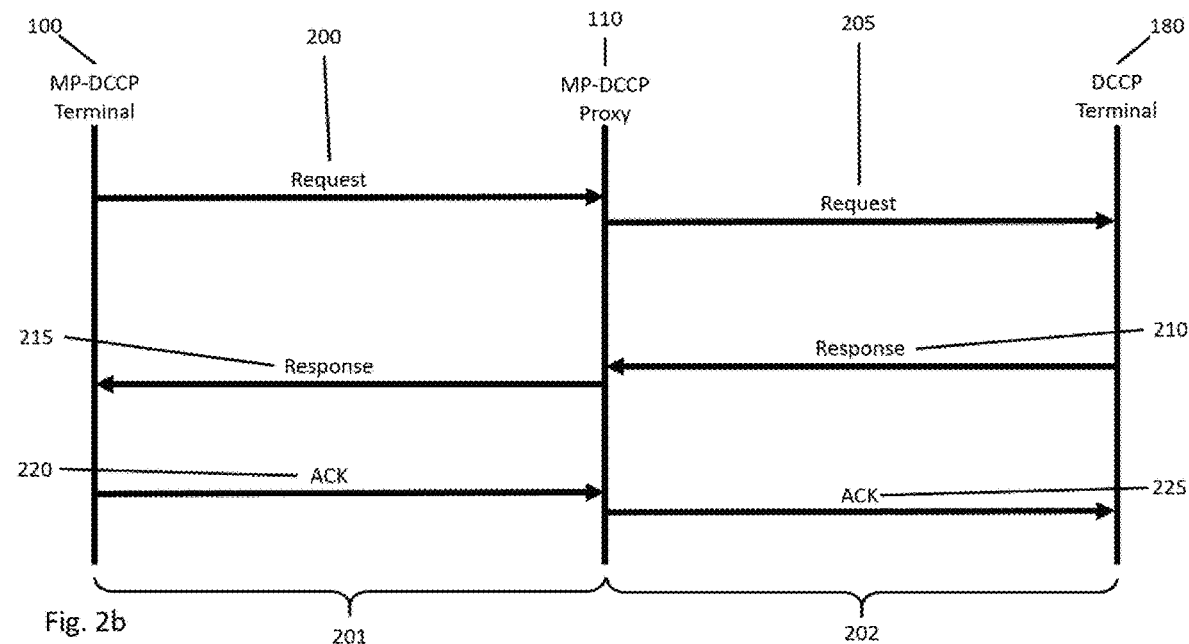
FIG. 2b shows a coordinated connection establishment between a sender and a receiver via the MP-DCCP proxy.

FIG. 2a shows an uncoordinated connection establishment between a sender and a receiver via the MP-DCCP proxy. FIG. 2b shows a coordinated connection establishment between a sender and a receiver via the MP-DCCP proxy.

A typical establishment process between a sender 100 and a receiver 180 by routing of the data traffic over a MP DCCP proxy 110 in the context of the invention is shown in FIG. 2a. 2b. FIG. 2a. 2b assume that the MP-DCCP sender 100 communicates with the DCCP capable receiver 180 through the MP-DCCP proxy 110. For performing the typical three way handshake, the sender 100 first establishes a MP-DCCP connection to the MP-DCCP Proxy 110 by performing a request 200 because it cannot communicate directly with the receiver 180. This request 200 triggers a second request 205 put by the MP-DCCP proxy 110 to the receiver 180. As can be seen, the first connection 201 is of MP nature, while the second connection 202 is of single path nature.

This procedure has the benefit, that the payload swapping can be applied between two independent (MP-)DCCP flows, to provide the conversion between multipath and single path transport.

The difference between the establishment processes of FIGS. 2a and 2b is that in the coordinated establishment process in individual steps of the 3-way handshake, namely the responses 210, 215 and the ACKs 220, 225 are coordinated by the MP-DCCP proxy 110 in a way that it always waits for the answer of the device it has most recently send a request 205, a response 215 to guarantee a successful chain of connected flows. In case of FIG. 2a, it can happen that the sender 100 starts sending payload data traffic even if the second connection 202 cannot be successfully established or has not yet been established successfully.

FIGS. 2a and 2b only present a minimal setup to connect a MP terminal 100 with a DCCP terminal 180, however in a Hybrid Access topology the setup enhances to DCCP terminal↔MP-DCCP Proxy↔MP-DCCP Proxy↔DCCP terminal.

Figure 3:
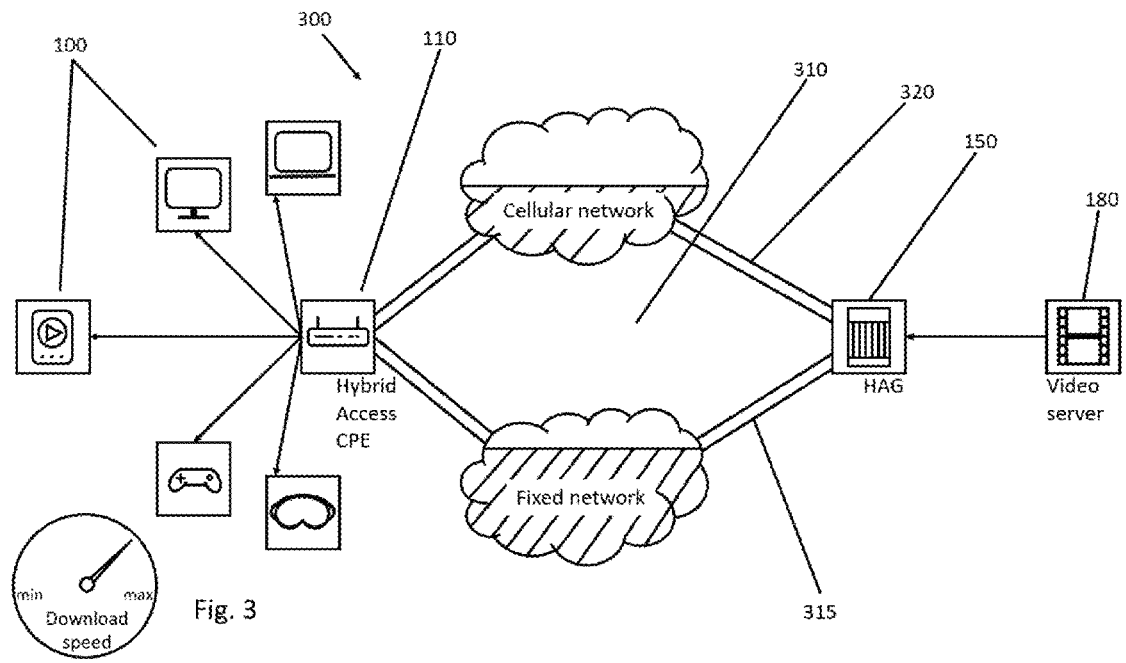
FIG. 3 shows a communication system according to an embodiment of the invention.

FIG. 3 shows a communication system 300 according to the invention. The communication system 300 comprises a first packet conversion device 110 in the embodiment of a multipath capable residual gateway 110, wherein multiple senders 100 have access to the communication network 310 by using the residual gateway 110. The senders can be 100 a smart phone, a computer, a tablet, a smart speaker, a server and/or other user equipment.

The communication network 310 is a multipath network and comprises a fixed network path 315 and cellular network path 320.

One or multiple senders 100 can send DCCP data traffic to the residential gateway 110, wherein the packet conversion module converts the DCCP data traffic to MP-DCCP data traffic and sends this data traffic over multiple paths, at least over the fixed network 315 and the cellular network 320, to the second packet conversion device 150, implemented as a HAG 150. The HAG 150 that converts the received MP-DCCP traffic to DCCP traffic and routes the DCCP traffic to the receiver 180 that can be a video server 180. Of course, this also works if the multiple senders send UDP or TCP data traffic as explained above. This only requires an appropriate configured packet conversion module. This communication system 300 provides the advantage that multiple user equipment devices can use MP-DCCP traffic if they are connected to the residential gateway 110.

Figure 4:
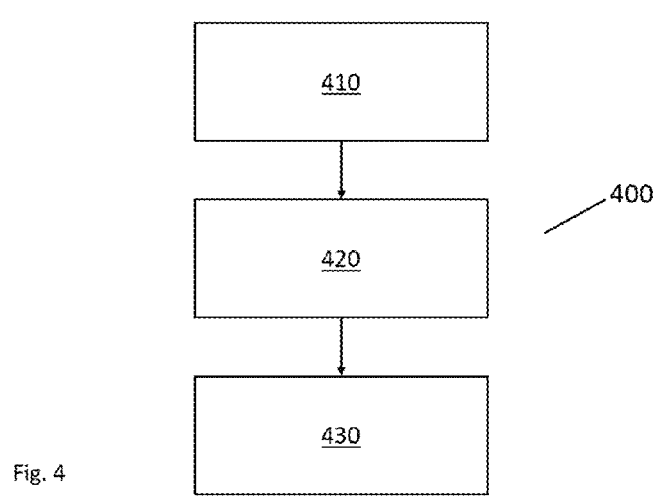
FIG. 4 shows a flowchart of the method according to an embodiment of the invention.

FIG. 4 shows a flowchart 400 of the method according to the invention.

The method comprises of the following steps:
410: operating a first single path interface that is arranged for data packet transmission over one communication path or a first multipath interface being arranged for data packet transmission over at least two communication paths; wherein the data traffic transmitted over the first single path interface or the first multipath interface is non MP-DCCP data traffic;
420: operating a second multipath interface that is arranged for data packet transmission over at least two communication paths; wherein the data traffic transmitted over the second multipath interface is MP-DCCP data traffic;
430: operating a packet conversion module that is arranged to convert non MP-DCCP data traffic to MP-DCCP data traffic and/or to convert MP-DCCP data traffic to non-MP-DCCP data traffic for further transmission.

The following references are fully incorporated by reference herein:
[1] Markus Amend and Dirk v. Hugo and Anna Brunstrom and Andreas Kassler and Veselin Rakocevic and Stephen Johnson, "DCCP Extensions for Multipath Operation with Multiple Addresses", draft-ietf-tsvwg-multipath-dccp-00. August 2021
[2] Sally Floyd and Mark J. Handley and Eddie Kohler, "Datagram Congestion Control Protocol (DCCP)", RFC no. 4340-3-2006
[3] datatracker.ietf.org/doc/html/rfc5762
[4] datatracker.ietf.org/doc/html/draft-ietf-tsvwg-udp-options-13

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system, comprising:
   a sender device, wherein the sender device is a Multipath-Datagram Congestion Control Protocol (MP-DCCP) terminal which supports MP-DCCP data traffic;
   a receiver device, wherein the receiver device is a DCCP terminal which supports single path DCCP data traffic; and
   a packet conversion device wherein the packet conversion device is an MP-DCCP Proxy and is configured to,
   perform a coordinated connection establishment between the sender device and the receiver device, wherein performing the coordinate connection establishment comprises, performing a three-way handshake between the sender device, the packet conversion device, and the receiver device:
   wherein performing the three-way handshake comprises:
      receiving, by the packet conversion device, a first MP-DCCP connection request from the sender device
      sending, by the packet conversion device, a second single path DCCP connection request to the receiver device
      receiving, by the packet conversion device, a response to the second single path DCCP connection request from the receiver device; and
      in response to receiving the response from the receiver device, sending, by the packet conversion device, a response to the first MP-DCCP connection request to the sender device
   wherein the packet conversion device is further configured to:
      receive MP-DCCP data traffic from the sender device via a first multipath interface:
      convert the received MP-DCCP data traffic to single path DCCP data traffic:
      and transmit the converted single path DCCP data traffic to the receiver device via a second single-path interface.

2. The system of claim 1, wherein the packet conversion device is configured to pass through options and/or feature elements of the received MP-DCCP data traffic for further transmission to the receiver device.

3. The system of claim 2, wherein the passed through options and/or feature elements, comprise:
   timestamp information,
   change local/remote (L/R),
   confirm L/R,
   data dropped,
   congestion control,
   congestion control ID (CCID)-specific features, and/or multi path capability.

4. The system of claim 1, wherein the packet conversion device is configured to pass through DCCP options and/or feature elements of the received MP-DCCP data traffic in a separate message for further transmission to the receiver device before payload transmission starts.

5. The system of claim 1, wherein the sender device is configured to select the packet conversion device by taking its local position into account.

6. The system of claim 5, wherein the sender device is configured to address a further packet conversion device based on a latency or round trip time of the packet conversion device exceeding a predefined threshold.

7. The system of claim 1, wherein the packet conversion device is arranged within a communication path between the sender device and the receiver device.

8. The system of claim 1, wherein the packet conversion device is a residual residential gateway.

9. The system of claim 1, wherein the packet conversion device is arranged outside a communication path between the sender device and the receiver device.

10. The system of claim 9, wherein the packet conversion device is a residential gateway.

11. A method, comprising:
    performing, by a packet conversion device, a coordinated connection establishment between a sender device and a receiver device;
    wherein the sender device is a Multipath-Datagram Congestion Control Protocol (MP-DCCP) terminal which supports MP-DCCP data traffic;
    wherein the receiver device is a DCCP terminal which supports single path DCCP data traffic;
    wherein performing the coordinate connection establishment comprises performing a three-way handshake between the sender device, the packet conversion device, and the receiver device;
    wherein performing the three-way handshake comprises:
       receiving, by the packet conversion device, a first MP-DCCP connection request from the sender device;
       sending, by the packet conversion device, a second single path DCCP connection request to the receiver device;
       receiving, by the packet conversion device, a response to the second single path DCCP connection request from the receiver device; and
       in response to receiving the response from the receiver device, sending, by the packet conversion device, a response to the first MP-DCCP connection request to the sender device;
    wherein the method further comprises:
       receiving, by the packet conversion device, MP-DCCP data traffic from the sender device via a first multipath interface;
       converting, by the packet conversion device, the received MP-DCCP data traffic to single path DCCP data traffic; and
       transmitting, by the packet conversion device, the converted single path DCCP data traffic to the receiver device via a second single-path interface.

12. A non-transitory computer-readable medium having processor-executable instructions stored thereon, wherein the processor-executable instructions, when executed by at least one processor, cause the performance the following:
    performing, by a packet conversion device, a coordinated connection establishment between a sender device and a receiver device;
    wherein the sender device is a Multipath-Datagram Congestion Control Protocol (MP-DCCP) terminal which supports MP-DCCP data traffic;
    wherein the receiver device is a DCCP terminal which supports single path DCCP data traffic;

wherein performing the coordinate connection establishment comprises performing a three-way handshake between the sender device, the packet conversion device, and the receiver device;

wherein performing the three-way handshake comprises:
   receiving, by the packet conversion device, a first MP-DCCP connection request from the sender device;
   sending, by the packet conversion device, a second single path DCCP connection request to the receiver device;
   receiving, by the packet conversion device, a response to the second single path DCCP connection request from the receiver device; and
   in response to receiving the response from the receiver device, sending, by the packet conversion device, a response to the first MP-DCCP connection request to the sender device;

wherein the processor-executable instructions, when executed by the at least one processor, further cause the perform:
   receiving, by the packet conversion device, MP-DCCP data traffic from the sender device via a first multipath interface;
   converting, by the packet conversion device, the received MP-DCCP data traffic to single path DCCP data traffic; and
   transmitting, by the packet conversion device, the converted single path DCCP data traffic to the receiver device via a second single-path interface.

* * * * *